(12) United States Patent
Xia et al.

(10) Patent No.: US 12,729,804 B2
(45) Date of Patent: Sep. 8, 2026

(54) FOLDABLE SUPPORT BRACKET

(71) Applicant: DONGGUAN OUSENLONG DIGITAL CO., LTD., Guangdong (CN)

(72) Inventors: Meihua Xia, Shenzhen (CN); Hongjun Ling, Shenzhen (CN)

(73) Assignee: DONGGUAN OUSENLONG DIGITAL CO., LTD, Dongguan (CN)

( * ) Notice: Subject to any disclaimer, the term of this patent is extended or adjusted under 35 U.S.C. 154(b) by 0 days.

(21) Appl. No.: 18/852,856

(22) PCT Filed: Oct. 17, 2022

(86) PCT No.: PCT/CN2022/125657

§ 371 (c)(1),
(2) Date: Sep. 30, 2024

(87) PCT Pub. No.: WO2024/036735

PCT Pub. Date: Feb. 22, 2024

(65) Prior Publication Data

US 2025/0228359 A1 Jul. 17, 2025

(30) Foreign Application Priority Data

Aug. 19, 2022 (CN) ......................... 202222200609.6

(51) Int. Cl.
*F16M 11/38* (2006.01)
*A47B 19/00* (2006.01)
(Continued)

(52) U.S. Cl.
CPC ........... *F16M 11/38* (2013.01); *A47B 19/002* (2013.01); *F16M 11/041* (2013.01); *F16M 11/10* (2013.01); *A47B 2019/008* (2013.01)

(58) Field of Classification Search
CPC .. A47B 19/02; A47B 2019/008; F16M 11/38; F16M 11/041; F16M 11/10
(Continued)

(56) References Cited

U.S. PATENT DOCUMENTS 165,346 A 7/1875 Lyons
535,557 A 3/1895 Rockwell
(Continued)

FOREIGN PATENT DOCUMENTS

CN 2485743 Y 4/2002
CN 2614532 Y 5/2004
(Continued)

OTHER PUBLICATIONS

Extended European search report dated Jun. 30, 2025 of corresponding EP application No. 22955509.9.
(Continued)

*Primary Examiner* — Todd M Epps
(74) *Attorney, Agent, or Firm* — Maschoff Brennan

(57) ABSTRACT

A foldable support bracket is provided and comprises a foot stand assembly (10), a telescoping rod assembly (20) and a support assembly (30); the telescoping rod assembly (20) has a first end and a second end opposite to each other, wherein the foot stand assembly (10) is provided on the first end of the telescoping rod assembly (20); the support assembly (30) is provided on the second end of the telescoping rod assembly in a collapsible manner, wherein the support assembly (30) has a deployed state and a collapsed state; wherein, the support assembly (30) comprises at least a main support member (31), a first linkage component (32) and a second linkage component (33); wherein, in the deployed state, the first linkage component (32) and the second linkage component (33) are unfolded to form a support surface; wherein, in the collapsed state, the first
(Continued)

linkage component (32) and the second linkage component (33) are respectively attached along the main support member (31) to form a rod-like structure. The structure of the foldable support bracket improves the support stability, and also achieves foldable collapsing and deploying, which is convenient to carry and use, and also facilitates manufacturers' packaging and transporting.

9 Claims, 10 Drawing Sheets

(51) Int. Cl.
*F16M 11/04* (2006.01)
*F16M 11/10* (2006.01)

(58) Field of Classification Search
USPC ..... 248/460, 463, 451, 443, 163.1, 165, 166
See application file for complete search history.

(56) References Cited

U.S. PATENT DOCUMENTS 696,993 A 4/1902 Mills
2,304,343 A * 12/1942 Diesbach ............... F16M 11/28 24/270
2,799,968 A 7/1957 Wythe
4,355,779 A * 10/1982 Heled .................. A47B 19/002 248/460
6,260,812 B1 * 7/2001 Auke ..................... A47B 19/08 248/463
6,682,042 B2 * 1/2004 Anderson ............ A47B 19/002 248/460
7,530,543 B1 * 5/2009 Kremzar ................ A47B 97/02 248/188.7
8,162,281 B2 * 4/2012 Logue .................... A47B 97/08 248/447
9,420,712 B2 * 8/2016 Yang ...................... F16M 11/38
9,909,250 B1 * 3/2018 Greenspon ......... A47G 25/0685
10,808,884 B2 * 10/2020 Shan .................... F16M 11/105
11,807,030 B1 * 11/2023 Hayes .................. F16M 11/242
12,209,703 B2 * 1/2025 Xia ........................ F16M 11/38
2023/0130809 A1 4/2023 Xia

FOREIGN PATENT DOCUMENTS

CN 202711675 U 1/2013
CN 202720883 U 2/2013
CN 108477833 A 9/2018
CN 208044928 U 11/2018
CN 209152538 U 7/2019
CN 112401471 A 2/2021
CN 212461126 U 2/2021
CN 216256002 U 4/2022
CN 216316276 U 4/2022
JP 3058022 U 6/1999
JP 2010110596 A 5/2010

OTHER PUBLICATIONS

1st Office Action dated Aug. 14, 2025 of corresponding JP application No. 2024-562012.
1st Office Action dated Oct. 20, 2025 of corresponding KR application No. 10-2024-7036835.
International Search Report and Written Opinion of the International Searching Authority dated May 18, 2023 as received in application No. PCT/CN2022/125657.

* cited by examiner

FOLDABLE SUPPORT BRACKET

CROSS REFERENCE TO RELATED APPLICATIONS

The present application claims priority of the Chinese patent application No. 202222200609.6 filed on Aug. 19, 2022 to the CNIPA, and entitled "foldable support bracket", the entire content of which is incorporated herein by reference.

TECHNICAL FIELD

The present application relates to the technical field of music stands, in particular relates to a foldable support bracket.

BACKGROUND

The existing music stands comprise components such as feet, telescoping rods, and music score placement plates. Generally, the feet and the telescoping rods are telescoping structures that can be folded, but the music score placement plates cannot be completely folded, and thus requires the disassembling of parts. The music score placement plates occupy a large space, causing inconvenience for manufacturers during packaging and transporting, and are also extremely inconvenient for users to carry.

SUMMARY OF THE INVENTION

The main purpose of the present application is to provide a foldable support bracket, which is intended to be collapsable and deployable in a foldable manner, so as to be convenient for carrying and using, and to facilitate packaging and transporting.

In order to achieve the above purpose, the present application provides a foldable support bracket that comprises:

a foot stand assembly;

a telescoping rod assembly, having a first end and a second end opposite to each other, wherein the foot stand assembly is provided on the first end of the telescoping rod assembly; and a support assembly provided on the second end of the telescoping rod assembly in a collapsible manner, wherein the support assembly has a deployed state and a collapsed state;

wherein, the support assembly comprises at least a main support member, a first linkage component and a second linkage component, the main support member being rotatably arranged on the second end of the telescoping rod assembly by means of a rotatable shaft; the first linkage component being rotatably arranged on the main support member; and the second linkage component being rotatably arranged on the main support member;

wherein, in the deployed state, the first linkage component and the second linkage component are unfolded to form a support surface;

wherein, in the collapsed state, the first linkage component and the second linkage component are respectively attached along the main support member to form a rod-like structure.

Optionally, the first linkage component is located on a top part of the main support member, and the second linkage component is located in a middle part of the main support member; the support assembly further comprises a third linkage component, the third linkage component being rotatably arranged at a bottom part of the main support member;

the first linkage component comprises a first top rod and a second top rod, and the first top rod and the second top rod are respectively rotatably arranged on the top part of the main support member;

the second linkage component comprises a first middle rod and a second middle rod, and the first middle rod and the second middle rod are respectively rotatably arranged on the middle part of the main support member;

the third linkage component comprises a first bottom rod and a second bottom rod, and the first bottom rod and the second bottom rod are respectively rotatably arranged on the bottom part of the main support member;

in the deployed state, the first top rod, the first middle rod and the first bottom rod are respectively located on one same side of the main support member, and the second top rod, the second middle rod and the second bottom rod are respectively located on the other side of the main support member, so as to form the support surface by unfolding the respective rods;

in the collapsed state, the first top rod, the second top rod, the first middle rod, the second middle rod, the first bottom rod and the second bottom rod are respectively attached along the main support member to form the rod-like structure.

Optionally, the first middle rod and the second middle rod are tensile rods configured to adjust a length size of the support surface in order to match articles of different lengths.

Optionally, the support assembly further comprises a clamping assembly, the clamping assembly comprising a first compression member and a second compression member for clamping edges of both lateral sides of an article, the first compression member being arranged at an end portion of the first middle rod, the second compression member being arranged at an end portion of the second middle rod.

Optionally, the first compression member and the second compression member both comprise an upper shell, a lower shell, a press block and a torsion spring, the upper shell being fixed to a front surface of the tensile rod, the lower shell being connected to the upper shell and fixed to a back surface of the tensile rod, the upper shell being provided with two insertion holes for insertion of both ends of a torsion shaft, the torsion spring being sleeved on the torsion shaft, one end of the torsion spring abutting against and connected with the press block, the other end of the torsion spring abutting against and connected with the upper shell, an end of the press block is connected to the upper shell by the torsion shaft, wherein the press block is of transparent material.

Optionally, the main support member is provided with a slide groove along its length, and an end of the first top rod and an end of the second top rod are both slidably arranged in the slide groove by a slidable rotary mechanism configured to adjust a width size of the support surface in order to match articles of different widths.

Optionally, the slidable rotary mechanism comprises a slidable block, a first toothed block, a second toothed block and a first fixed block slidably arranged in the slide groove, one end of the first toothed block being fixed to the first top rod, the other end of the first toothed block being constrained between the slidable block and the first fixed block in a rotatable manner by a first rotation shaft, one end of the second toothed block being fixed to the second top rod, the other end of the second toothed block being constrained between the slidable block and the first fixed block in a rotatable manner by a second rotation shaft.

Optionally, the slidable rotary mechanism further comprises two friction blocks, the slidable block comprising a slidable upper shell and a slidable lower shell, the slidable upper shell and the slidable lower shell enclosing a mounting cavity, the two friction blocks being placed in the mounting cavity, and groove walls on two lateral sides of the mounting cavity are both provided with an avoidance port for an outer end of each of the two friction blocks to pass through, one end of each of the two friction blocks being sleeved with a resilient member, the other end of each of the two friction blocks abutting against a groove wall on each of two lateral sides of the slide groove respectively.

Optionally, the first bottom rod and the second bottom rod are both provided with a pallet for holding a bottom of an article.

Optionally, an end of the first bottom rod and an end of the second bottom rod are both arranged on the main support member by means of a rotary assembly, the rotary assembly comprising a support block, a third toothed block, a fourth toothed block and a second fixed block provided on the main support member, one end of the third toothed block being fixed to the first bottom rod, the other end of the third toothed block being constrained between the support block and the second fixed block in a rotatable manner by a third rotation shaft, one end of the fourth toothed block being fixed to the second bottom rod, the other end of the fourth toothed block being constrained between the support block and the second fixed block in a rotatable manner by a fourth rotation shaft.

In the technical solution of the present application, the foldable support bracket comprises a foot stand assembly, a telescoping rod assembly and a support assembly; the telescoping rod assembly has a first end and a second end opposite to each other, wherein the foot stand assembly is provided on the first end of the telescoping rod assembly; the support assembly is provided on the second end of the telescoping rod assembly in a collapsible manner, wherein the support assembly has a deployed state and a collapsed state; wherein, the support assembly comprises at least a main support member, a first linkage component and a second linkage component, the main support member is rotatably arranged on the second end of the telescoping rod assembly by means of a rotatable shaft; the first linkage component is rotatably arranged on the main support member; and the second linkage component is rotatably arranged on the main support member; wherein, in the deployed state, the first linkage component and the second linkage component are unfolded to form a support surface; wherein, in the collapsed state, the first linkage component and the second linkage component are respectively attached along the main support member to form a rod-like structure. In this way, it achieves foldable collapsing and deploying, which is convenient for users to carry and use, and also facilitates manufacturers' packaging and transporting.

BRIEF DESCRIPTION OF THE DRAWINGS

In order to more clearly explain the technical solutions in the embodiments of the present application or in the prior art, accompanying drawings that need to be used in the description of the embodiments or the prior art are briefly introduced below. Apparently, the accompanying drawings described below only represent some embodiments of the present application. For a person with ordinary skill in the art, other accompanying drawings are obtainable according to the structures shown in these accompanying drawings without expenditure of any creative labor.

Reference Signs

Figure 1:
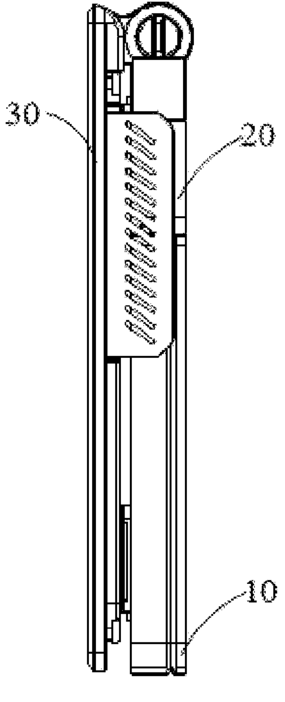
FIG. 1 is a structural schematic diagram of the support assembly of the foldable support bracket in the collapsed state in an embodiment of the present application.

10, foot stand assembly; 20, telescoping rod assembly; 30, support assembly; 101, support surface; 31, main support member; 32, first linkage component; 33, second linkage component; 34, third linkage component; 321, first top rod; 322, second top rod; 331, first middle rod; 332, second middle rod; 341, first bottom rod; 342, second bottom rod; 40, clamping assembly; 411, upper shell; 412, lower shell; 413, press block; 311, rotatable shaft; 31*a*, slide groove; 51, slidable block; 52, first toothed block; 53, second toothed block; 54, first fixed block; 55, friction block; 56, resilient member; 343, pallet; 61, support block; 62, third toothed block; 63, fourth toothed block; 64, second fixed block.

The implementation of the purpose, functional features and advantages of the present application will be further described in conjunction with the embodiments and with reference to the drawings.

DETAILED DESCRIPTION OF SPECIFIC EMBODIMENTS

Hereinafter, the technical solution in the embodiments of the present application will be clearly and completely described in combination with accompanying drawings in the embodiments of the application. Apparently, embodiments described only represent part of the embodiments of the present application, not all the embodiments. All other embodiments obtainable by those ordinarily skilled in the art based on the embodiments described in the present application without expenditure of creative labor all fall within the scope of protection of the present application.

It should be noted that, if the embodiments of the present application involve directional indications (such as up, down, left, right, forward, back, . . . ), such directional indications are only used to explain the relative positional relationship, movement condition and the like among the various components in a specific attitude (as shown in the accompanying drawings), and if the specific attitude is changed, the directional indications would also change accordingly.

Furthermore, if the embodiments of the present application contain the descriptions of "first", "second", etc., the descriptions of "first", "second", etc. are used only for descriptive purposes, and are not to be understood as indicating or implying their relative importance or implicitly specifying the number of the indicated technical features. Thus, a feature defined as "first" or "second" may explicitly or implicitly include at least one of the features. In addition, the meaning of "and/or" appearing in the entire description is that three parallel embodiments are included, for example, "A and/or B" includes an A embodiment, or B embodiment, or an embodiment in which both A and B are satisfied. In addition, the technical solutions among the various embodiments may be combined with each other, but it must be based on the fact that a person with ordinary skill in the art is able to achieve it, and when a combination of the technical solutions appears to be contradictory or unachievable, it should be regarded that such a combination of the technical solutions does not exist, and is not included in the scope of protection claimed by the present application.

The present application provides a foldable support bracket suitable for supporting articles such as music scores, books or folders.

Figure 2:
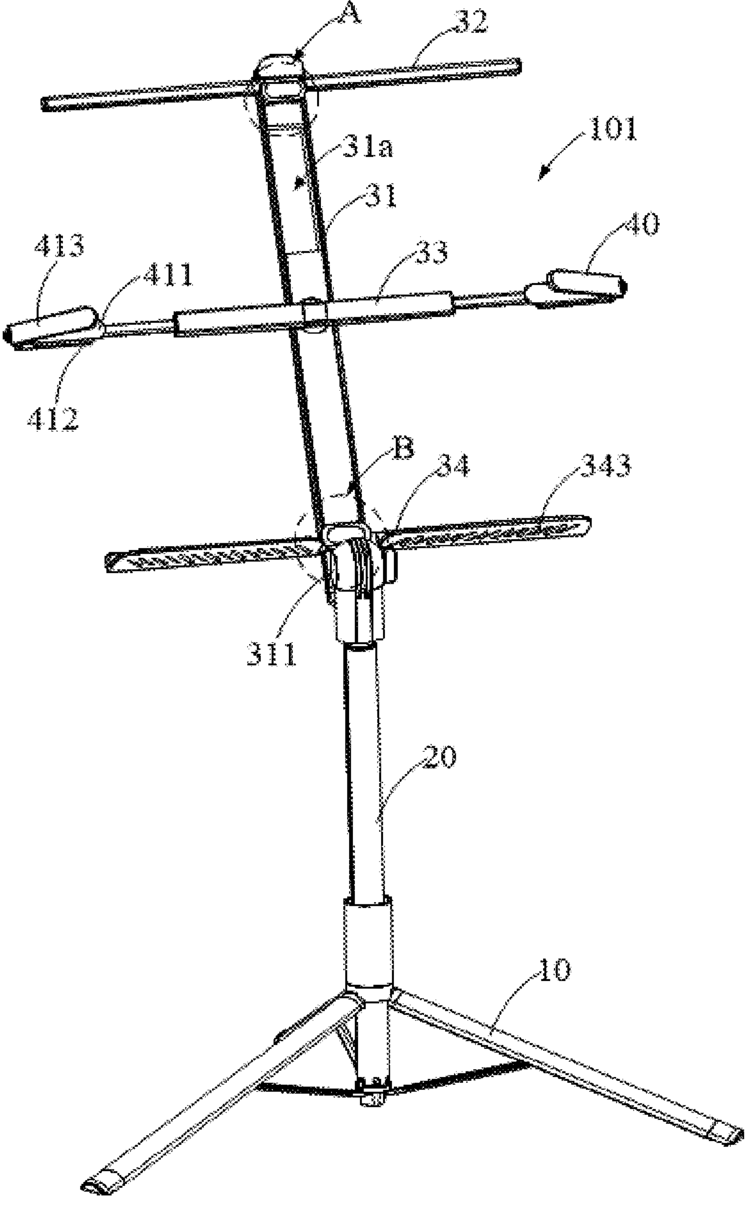
FIG. 2 is a structural schematic diagram of the support assembly of the foldable support bracket in the deployed state in an embodiment of the present application.

Referring to FIGS. 1 and 2, in an embodiment of the present application, the foldable support bracket comprises a foot stand assembly 10, a telescoping rod assembly 20 and a support assembly 30; the telescoping rod assembly 20 has a first end and a second end opposite to each other, wherein the foot stand assembly 10 is provided on the first end of the telescoping rod assembly 20; the support assembly 30 is provided on the second end of the telescoping rod assembly 20 in a collapsible manner, wherein the support assembly 30 has a deployed state and a collapsed state; wherein, in the deployed state, the support assembly 30 is unfolded to form a support surface 101 for supporting an article, as shown in FIG. 2; wherein, in the collapsed state, the support assembly 30 is folded to form a rod-like structure as a whole, as shown in FIG. 1.

In this embodiment, the foot stand assembly 10 may be a tripod or a multi-leg-stand, etc., for supporting the telescoping rod assembly 20 and the support assembly 30 on the ground or a table, and the foot stand assembly 10 may be slidably sleeved at the lower end of the telescoping rod assembly 20.

The telescoping rod assembly 20 may comprise a plurality of telescopic rods capable of adjusting the support height for the convenience of the user.

The support assembly 30 may comprise a plurality of support rods or support plates, and the support assembly 30 may be switched between the deployed state and the collapsed state by a rotary mechanism, a slidable mechanism, an articulating mechanism, or the like, which is not specifically limited herein.

In this embodiment, the support assembly 30 may comprise a main support member 31, a first linkage component 32, a second linkage component 33, and a third linkage component 34. It should be noted that, in order to form a support surface 101 for supporting articles such as a music score or a book, the support assembly 30 of the present foldable support bracket may comprise at least two linkage components, i.e., the first linkage component 32 and the second linkage component 33, the respective linkage components may be spaced apart on the main support member 31, and the number of linkage components is not limited herein.

In this embodiment, the main support member 31 is rotatably arranged on the second end of the telescoping rod assembly 20 by means of a rotatable shaft 311. The first linkage component 32 is rotatably arranged at the top of the main support member 31; the second linkage component 33 is rotatably arranged at the middle of the main support member 31; and the third linkage component 34 is rotatably arranged at the bottom of the main support member 31. In the deployed state, the first linkage component 32, the second linkage component 33, and the third linkage component 34 are unfolded to form a support surface 101; and in the collapsed state, the first linkage component 32, the second linkage component 33, and the third linkage component 34 are respectively attached along the main support member 31 to form a rod-like structure.

In the technical solution of the present application, the foldable support bracket comprises a foot stand assembly 10, a telescoping rod assembly 20 and a support assembly 30; the telescoping rod assembly 20 has a first end and a second end opposite to each other, wherein the foot stand assembly 10 is provided on the first end of the telescoping rod assembly 20; the support assembly 30 is provided on the second end of the telescoping rod assembly 20 in a collapsible manner, wherein the support assembly 30 has a deployed state and a collapsed state; wherein, in the deployed state, the support assembly 30 is unfolded to form a support surface 101 for supporting an article; wherein, in the collapsed state, the support assembly 30 is folded to form a rod-like structure as a whole. In this way, it achieves foldable collapsing and deploying, which is convenient for users to carry and use, and also facilitates manufacturers' packaging and transporting.

It should be noted that since the support assembly 30 is provided on the telescoping rod assembly 20 in a collapsible manner, after collapsing the support assembly 30, as shown in FIG. 1, it can be further folded and attached on one side of the telescoping rod assembly 20, which reduces the length size of the entire support bracket after folding as much as possible.

In order to further improve the convenience for folding and unfolding the support bracket, and to enhance the stability of its supported articles, with reference to FIGS. 2 to 10, in an embodiment, the first linkage component 32 comprises a first top rod 321 and a second top rod 322, and the first top rod 321 and the second top rod 322 are respectively rotatably arranged on the top part of the main support member 31. The second linkage component 33 comprises a first middle rod 331 and a second middle rod 332, and the first middle rod 331 and the second middle rod 332 are respectively rotatably arranged on the middle part of the main support member 31. The third linkage component 34 comprises a first bottom rod 341 and a second bottom rod 342, and the first bottom rod 341 and the second bottom rod 342 are respectively rotatably arranged on the bottom part of the main support member.

Figure 10:
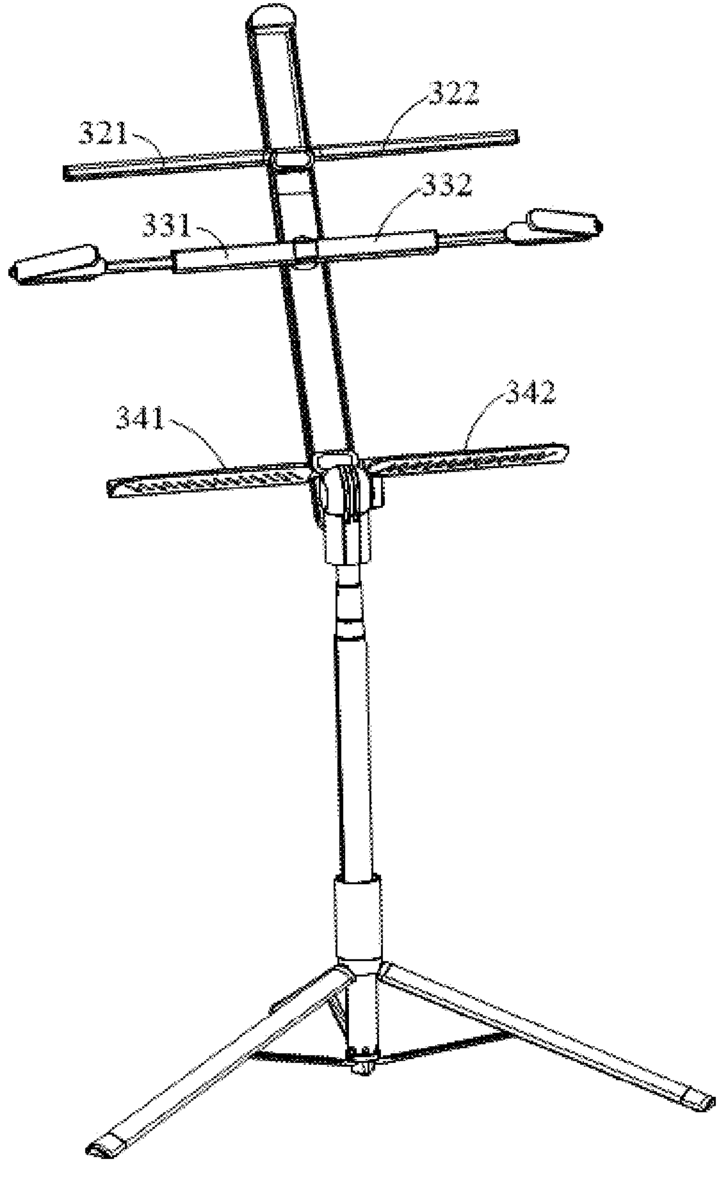
FIG. 10 is a structural schematic diagram of the support assembly of the foldable support bracket in a fully deployed state in an embodiment of the present application.

Referring to FIG. 10, in the deployed state, the first top rod 321, the first middle rod 331, and the first bottom rod 341 are respectively located on one same side of the main support member 31, and the second top rod 322, the second middle rod 332 and the second bottom rod 342 are respectively located on the other side of the main support member 31, so as to form the support surface 101 by unfolding the respective rods.

Figure 5:
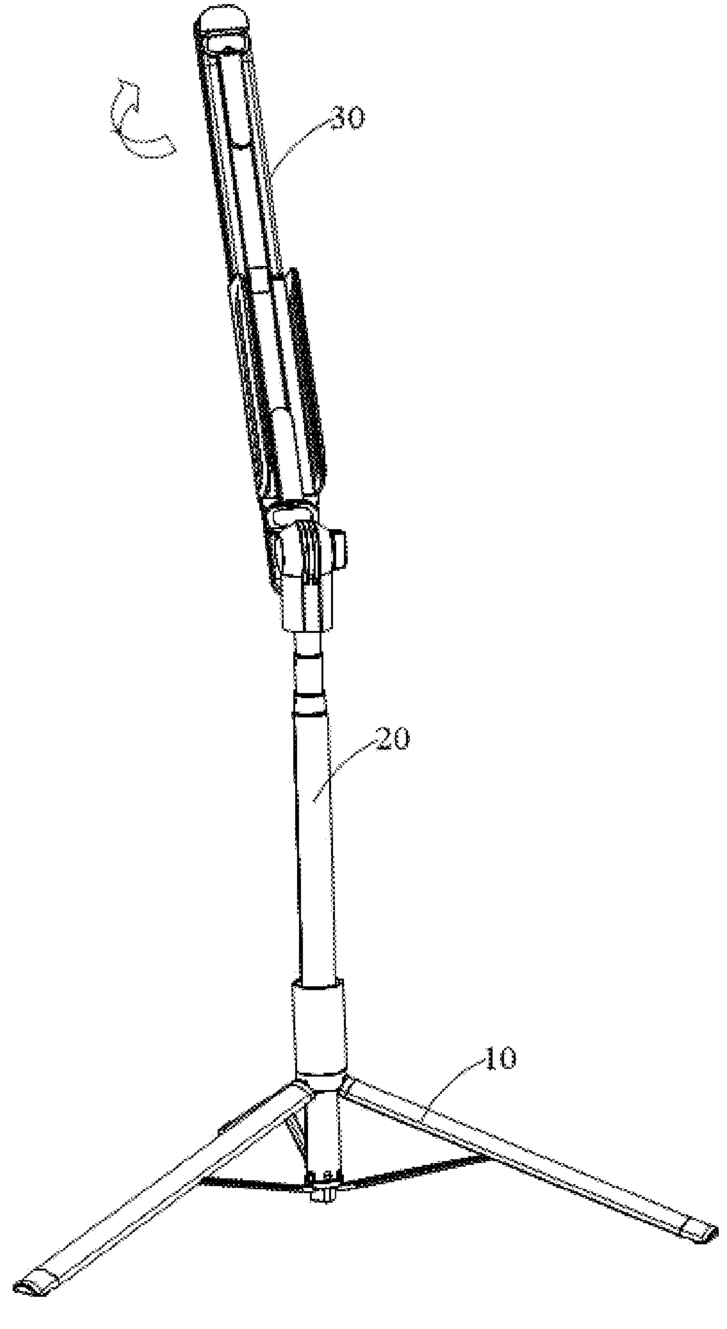
FIG. 5 is a structural schematic diagram of the support assembly of the foldable support bracket in the deploying process in an embodiment of the present application.

Referring mainly to FIG. 5, in the collapsed state, the first top rod 321, the second top rod 322, the first middle rod 331, the second middle rod 332, the first bottom rod 341 and the second bottom rod 342 are respectively attached along the main support member 31 to cause the support assembly 30 to form the rod-like structure.

Figure 8:
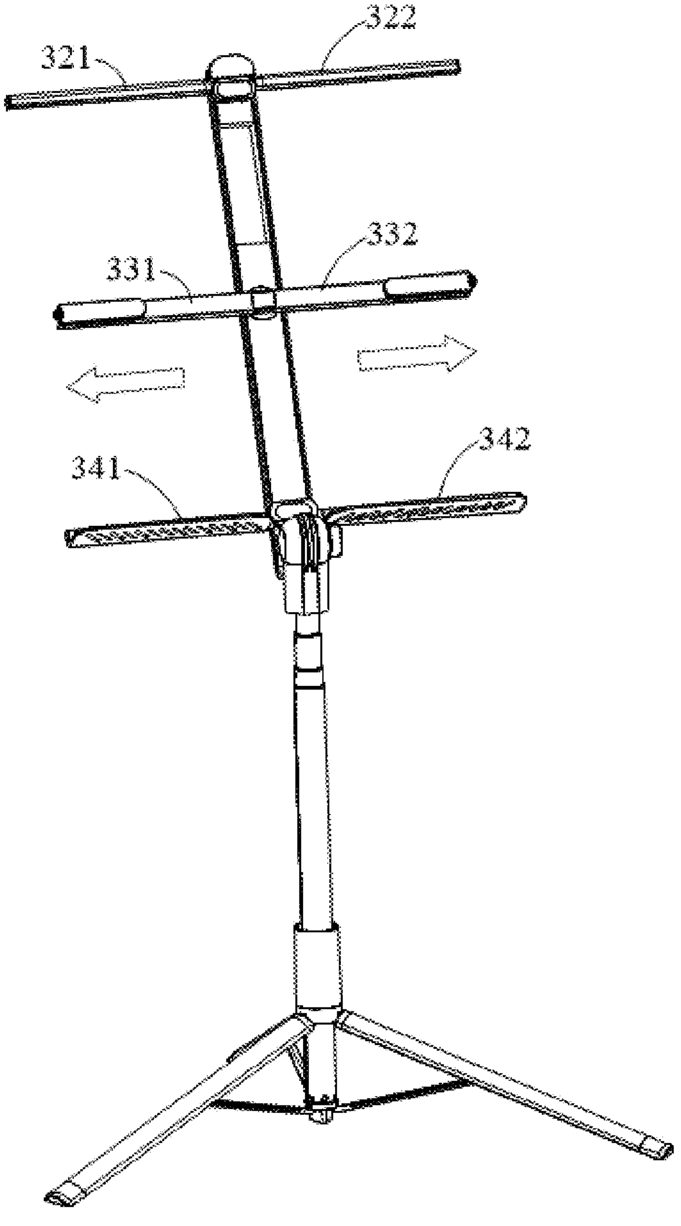
FIG. 8 is a structural schematic diagram of the support assembly of the foldable support bracket in the deploying process in an embodiment of the present application.

Referring mainly to FIG. 8, in the present embodiment, both the first middle rod 331 and the second middle rod 332 may be tensile rods configured to adjust a length size of the support surface 101 in order to match articles of different lengths. In this way, the need to support articles such as music scores, books or folders of more specifications can be met, which improves the applicability of the foldable support bracket.

As shown in FIG. 2, in an embodiment, the support assembly 30 may further comprise a clamping assembly, the clamping assembly comprises a first compression member and a second compression member for clamping edges of both lateral sides of an article, the first compression member is arranged at an end portion of the first middle rod 331, the second compression member is arranged at an end portion of the second middle rod 332.

In this embodiment, the first compression member and the second compression member both comprise an upper shell 411, a lower shell 412, a press block 413 and a torsion spring, the upper shell 411 is fixed to a front surface of the tensile rod, the lower shell 412 is connected to the upper shell 411 and fixed to a back surface of the tensile rod, the upper shell 411 is provided with two insertion holes for insertion of both ends of a torsion shaft, the torsion spring is sleeved on the torsion shaft, one end of the torsion spring abuts against and is connected with the press block 413, the other end of the torsion spring abuts against and is connected with the upper shell 411, an end of the press block 413 is connected to the upper shell 411 by the torsion shaft. In this way, the solidity of the foldable support bracket for supporting an article can be further enhanced, and the article can be effectively prevented from slipping off.

In this embodiment, the press block 413 may be of transparent material such as acrylic, so that when clamping the edges of an article such as a music score or a book, users can effectively view contents such as text or pictures under the clamping assembly through the transparent clamping assembly, which greatly enhances the user experience.

Figure 3:
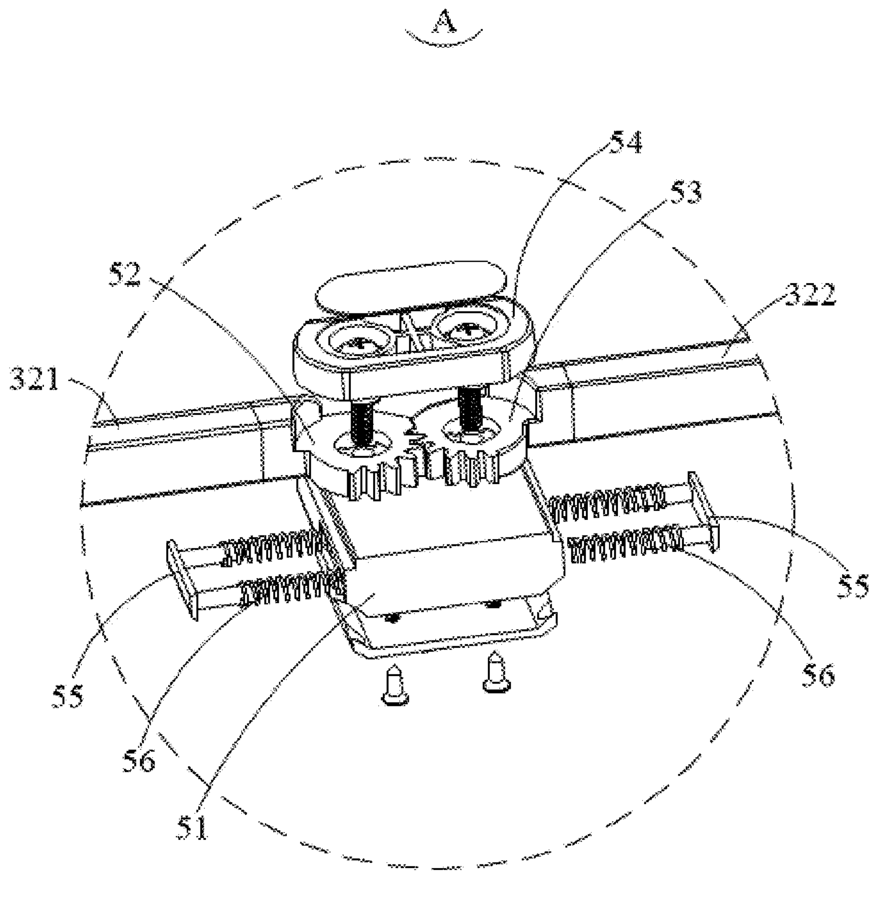
FIG. 3 is an explosive view of part A in FIG. 2.

In order to further enhance the applicability of the foldable support bracket to fit more specifications of articles, referring to FIGS. 2 and 3, in an embodiment, the main support member 31 is provided with a slide groove 31*a* along its length, and an end of the first top rod 321 and an end of the second top rod 322 are both slidably arranged in the slide groove 31*a* by a slidable rotary mechanism configured to adjust a width size of the support surface 101 in order to match articles of different widths.

Referring mainly to FIG. 3, in this embodiment, the slidable rotary mechanism may comprise a slidable block 51, a first toothed block 52, a second toothed block 53 and a first fixed block 54 slidably arranged in the slide groove 31*a*, one end of the first toothed block 52 is fixed to the first top rod 321, the other end of the first toothed block 52 is constrained between the slidable block 51 and the first fixed block 54 in a rotatable manner by a first rotation shaft, one end of the second toothed block is fixed to the second top rod 322, the other end of the second toothed block 53 is constrained between the slidable block 51 and the first fixed block 54 in a rotatable manner by a second rotation shaft. In this way, it is possible to achieve the function of foldable collapsing and deploying of the first linkage component 32, and at the same time also enhance the applicability of the support bracket.

Figure 6:
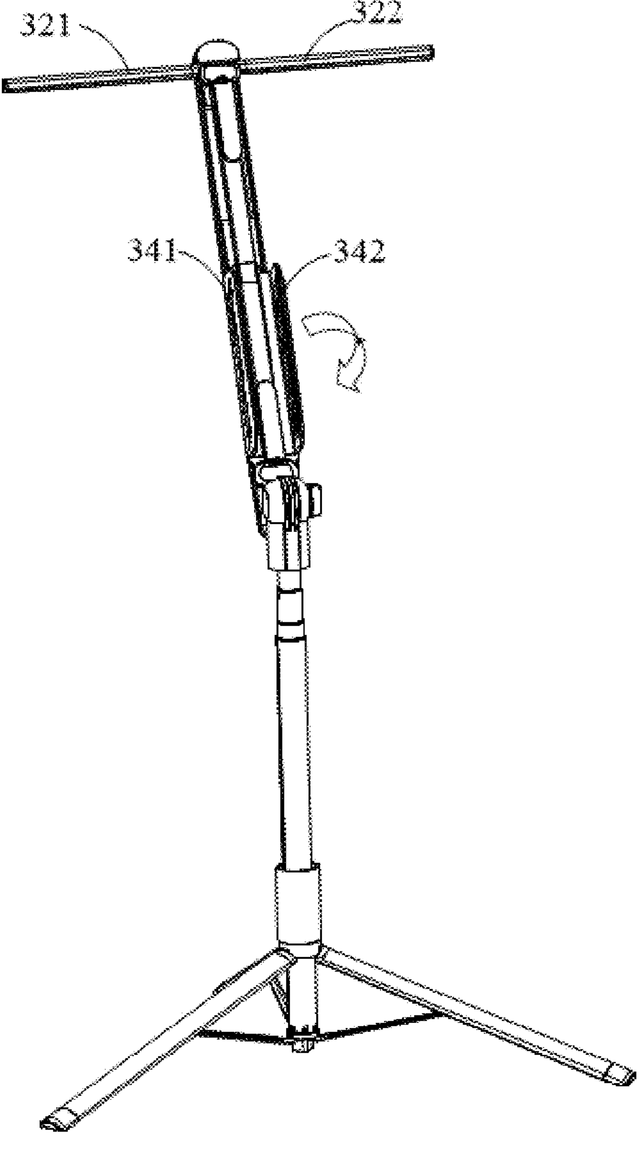
FIG. 6 is a structural schematic diagram of the support assembly of the foldable support bracket in the deploying process in an embodiment of the present application.
Figure 7:
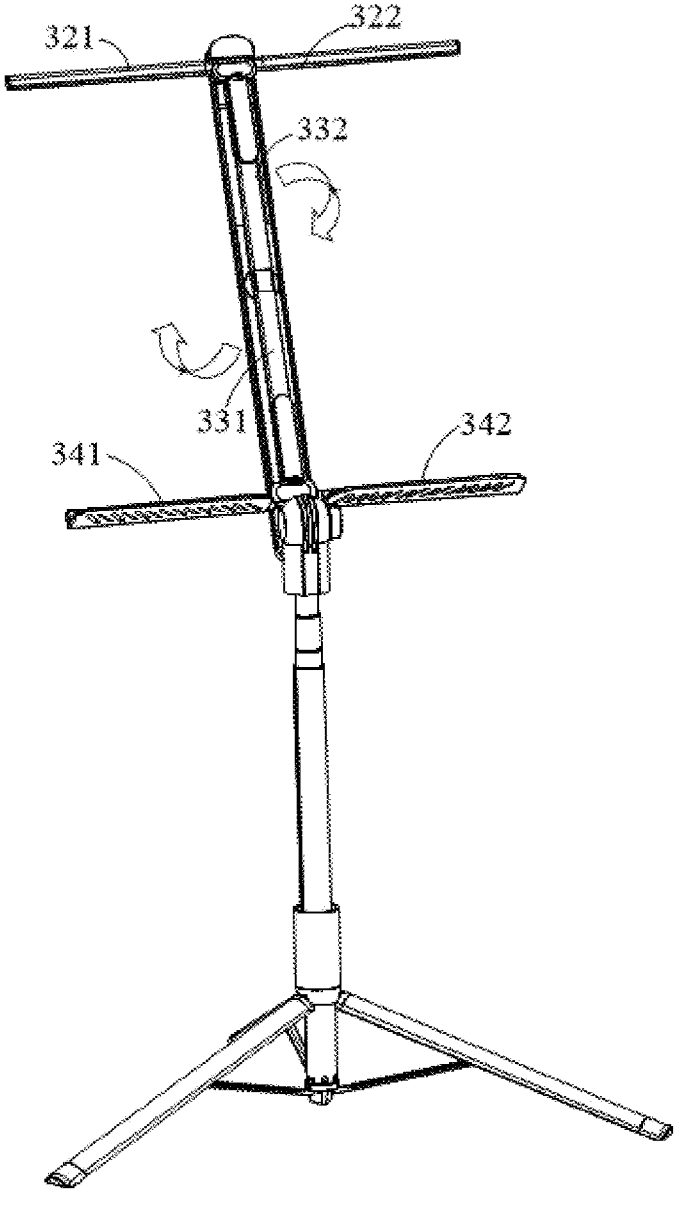
FIG. 7 is a structural schematic diagram of the support assembly of the foldable support bracket in the deploying process in an embodiment of the present application.
Figure 9:
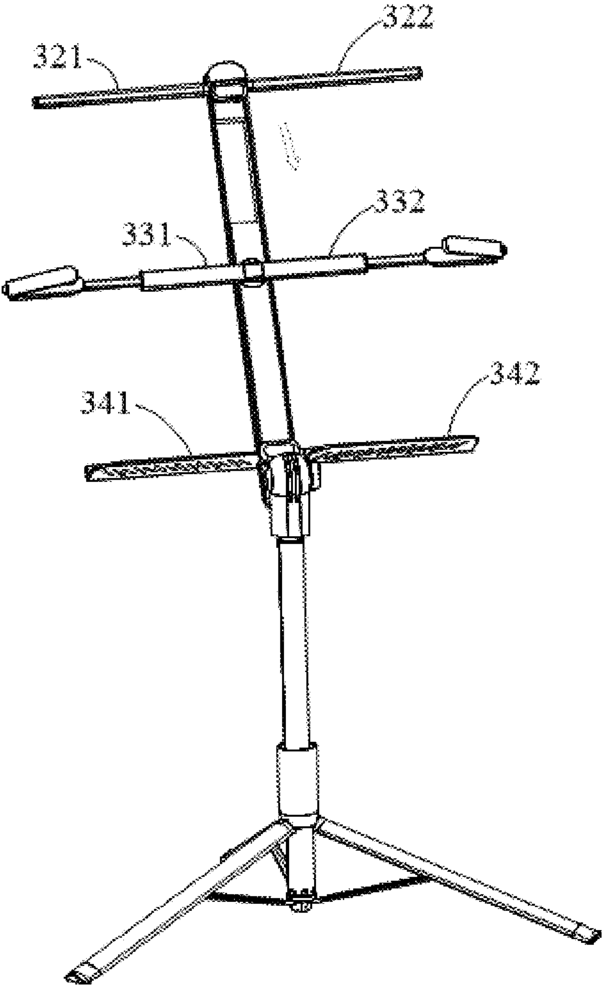
FIG. 9 is a structural schematic diagram of the support assembly of the foldable support bracket in the deploying process in an embodiment of the present application.

In use, in conjunction with FIGS. 1 and 5, the support assembly 30 can be rotated upwardly to open and the foot stand assembly 10 can be operated to slide downwardly to open, and the foot stand assembly 10 can be placed on the ground; referring to FIGS. 5 and 6, the first top rod 321 and the second top rod 322 are then rotated to open; referring to FIGS. 6 and 7, the first bottom rod 341 and the second bottom rod 342 are then rotated to open; referring to FIGS. 7 and 8, the first middle rod 331 and the second middle rod 332 are then rotated to open; referring to FIGS. 8 and 9, the length of the first middle rod 331 and the length of the second middle rod 332 are then stretched according to the length of the article, so as to adjust the length of the support surface 101; referring to FIGS. 9 and 10, the first top rod 321 and the second top rod 322 are then operated to slide according to the width of the article, so as to adjust the width of the support surface 101; and finally, the article such as a music score is placed onto the support surface 101, and the edges of both lateral sides of the article are respectively clamped by means of the first compression member and the second compression member.

Referring to FIG. 3, in an embodiment, the slidable rotary mechanism may further comprise two friction blocks 55, the slidable block 51 comprises a slidable upper shell and a slidable lower shell, the slidable upper shell and the slidable lower shell enclose a mounting cavity, the two friction blocks 55 are placed in the mounting cavity, and groove walls on two lateral sides of the mounting cavity are both provided with an avoidance port for an outer end of each of the two friction blocks 55 to pass through, one end of each of the two friction blocks 55 is sleeved with a resilient member 56, the other end of each of the two friction blocks 55 abuts against a groove wall on each of two lateral sides of the slide groove 31*a* respectively.

It should be understood that, by arranging the friction blocks 55 to resiliently abut against the groove walls of the slide groove 31*a*, it can be used to protect the slidable block 51 to avoid wear and tear of the slidable block 51 caused by contacting with the groove walls of the slide groove 31*a* during sliding, which prolongs the service life of the slidable block 51, and can satisfy the smoothness of sliding movement of the slidable block 51 in the slide groove 31*a*.

Referring to FIG. 2, in an embodiment, the first bottom rod 341 and the second bottom rod 342 are both provided with a pallet 343 for holding a bottom of an article, so as to further enhance the stability of the foldable support bracket for supporting articles.

Figure 4:
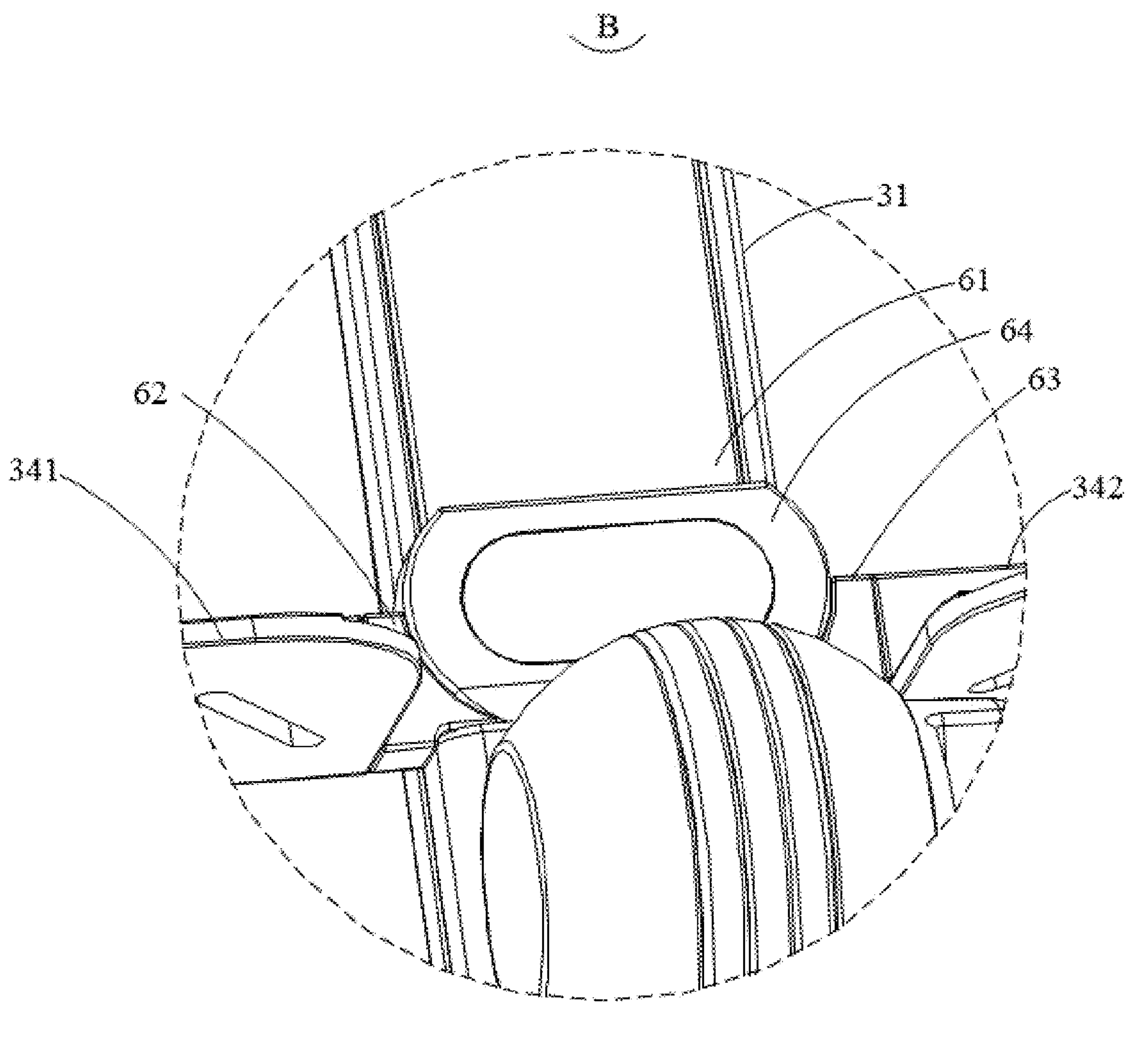
FIG. 4 is an enlarged view of part B in FIG. 2.

In order to achieve the function of foldable collapsing and deploying of the third linkage component 34, referring to FIGS. 2 and 4, in an embodiment, an end of the first bottom rod 341 and an end of the second bottom rod 342 are both arranged on the main support member 31 by means of a rotary assembly, the rotary assembly comprises a support block 61, a third toothed block 62, a fourth toothed block 63 and a second fixed block 64 provided on the main support member 31, one end of the third toothed block 62 is fixed to the first bottom rod 341, the other end of the third toothed block 62 is constrained between the support block 61 and the second fixed block 64 in a rotatable manner by a third rotation shaft, one end of the fourth toothed block 63 is fixed to the second bottom rod 342, the other end of the fourth toothed block 63 is constrained between the support block 61 and the second fixed block 64 in a rotatable manner by a fourth rotation shaft.

Similarly, in this embodiment, the second linkage component 33 may also adopt a similar connection structure as the rotary assembly connected to the third linkage component 34 to achieve rotatably deploying and collapsing, which is not specifically limited herein.

Referring to FIG. 10, when the support assembly 30 is in the deployed state, the central lines of both the first top rod 321 and the second top rod 322 may be on the same line which may be perpendicular to or slightly inclined relative to the central line of the main support member 31; the central lines of both the first middle rod 331 and the second middle rod 332 may be on the same line which may be perpendicular to or slightly inclined relative to the central line of the main support member 31; and the central lines of both the first bottom rod 341 and the second bottom rod 342 may be on the same line which may be perpendicular to or slightly inclined relative to the central line of the main support member 31.

Referring to FIG. 5, when the support assembly 30 is in the collapsed state, the central lines of both the first top rod 321 and the second top rod 322 coincide with or are parallel to the central line of the main support member 31; the central lines of both the first middle rod 331 and the second middle rod 332 coincide with or are parallel to the central line of the main support member 31; and the central lines of both the first bottom rod 341 and the second bottom rod 342 coincide with or are parallel to the central line of the main support member 31.

The above mentioned are only optional embodiments of the present application, and are not intended to limit the scope of the present patent application, and any equivalent structural variation made under the inventive concept of the present application by using the contents of the specification and the accompanying drawings of the present application or directly/indirectly applying them in other related technical fields is included in the scope of protection of the present patent application.

The invention claimed is:

1. A foldable support bracket, comprising:

a foot stand assembly;

a telescoping rod assembly, having a first end and a second end opposite to each other, wherein the foot stand assembly is provided on the first end of the telescoping rod assembly; and a support assembly provided on the second end of the telescoping rod assembly in a collapsible manner, wherein the support assembly has a deployed state and a collapsed state;

wherein, the support assembly comprises at least a main support member, a first linkage component and a second linkage component, the main support member being rotatably arranged on the second end of the telescoping rod assembly by means of a rotatable shaft; the first linkage component being rotatably arranged on the main support member; and the second linkage component being rotatably arranged on the main support member;

wherein, in the deployed state, the first linkage component and the second linkage component are unfolded to form a support surface;

wherein, in the collapsed state, the first linkage component and the second linkage component are respectively attached along the main support member to jointly form a rod-like structure;

wherein the first linkage component is located on a top part of the main support member, and the second linkage component is located in a middle part of the main support member; the support assembly further comprises a third linkage component, the third linkage component being rotatably arranged at a bottom part of the main support member;

the first linkage component comprises a first top rod and a second top rod, and the first top rod and the second top rod are respectively rotatably arranged on the top part of the main support member;

the second linkage component comprises a first middle rod and a second middle rod, and the first middle rod and the second middle rod are respectively rotatably arranged on the middle part of the main support member;

the third linkage component comprises a first bottom rod and a second bottom rod, and the first bottom rod and the second bottom rod are respectively rotatably arranged on the bottom part of the main support member;

in the deployed state, the first top rod, the first middle rod and the first bottom rod are respectively located on one same side of the main support member, and the second top rod, the second middle rod and the second bottom rod are respectively located on the other side of the main support member, so as to form the support surface by unfolding the respective rods;

in the collapsed state, the first top rod, the second top rod, the first middle rod, the second middle rod, the first bottom rod and the second bottom rod are respectively attached along the main support member to jointly form the rod-like structure.

2. The foldable support bracket according to claim 1, wherein the first middle rod and the second middle rod are tensile rods configured to adjust a length size of the support surface in order to match articles of different lengths.

3. The foldable support bracket according to claim 2, wherein the support assembly further comprises a clamping assembly, the clamping assembly comprising a first compression member and a second compression member for clamping edges of both lateral sides of an article, the first compression member being arranged at an end portion of the first middle rod, the second compression member being arranged at an end portion of the second middle rod.

4. The foldable support bracket according to claim 3, wherein the first compression member and the second compression member both comprise an upper shell, a lower shell, a press block and a torsion spring, the upper shell being fixed to a front surface of the tensile rod, the lower shell being connected to the upper shell and fixed to a back surface of the tensile rod, the upper shell being provided with two insertion holes for insertion of both ends of a torsion shaft, the torsion spring being sleeved on the torsion shaft, one end of the torsion spring abutting against and connected with the press block, the other end of the torsion spring abutting against and connected with the upper shell, an end of the press block is connected to the upper shell by the torsion shaft, wherein the press block is of transparent material.

5. The foldable support bracket according to claim 1, wherein the main support member is provided with a slide groove along its length, and an end of the first top rod and an end of the second top rod are both slidably arranged in the slide groove by a slidable rotary mechanism configured to adjust a width size of the support surface in order to match articles of different widths.

6. The foldable support bracket according to claim 5, wherein the slidable rotary mechanism comprises a slidable block, a first toothed block, a second toothed block and a first fixed block slidably arranged in the slide groove, one end of the first toothed block being fixed to the first top rod, the other end of the first toothed block being constrained between the slidable block and the first fixed block in a rotatable manner by a first rotation shaft, one end of the second toothed block being fixed to the second top rod, the other end of the second toothed block being constrained between the slidable block and the first fixed block in a rotatable manner by a second rotation shaft.

7. The foldable support bracket according to claim 6, wherein the slidable rotary mechanism further comprises two friction blocks, the slidable block comprising a slidable upper shell and a slidable lower shell, the slidable upper shell and the slidable lower shell enclosing a mounting cavity, the two friction blocks being placed in the mounting cavity, and groove walls on two lateral sides of the mounting cavity are both provided with an avoidance port for an outer end of each of the two friction blocks to pass through, one end of each of the two friction blocks being sleeved with a resilient member, the other end of each of the two friction blocks abutting against a groove wall on each of two lateral sides of the slide groove respectively.

8. The foldable support bracket according to claim 1, wherein the first bottom rod and the second bottom rod are both provided with a pallet for holding a bottom of an article.

9. The foldable support bracket according to claim 1, wherein an end of the first bottom rod and an end of the second bottom rod are both arranged on the main support member by means of a rotary assembly, the rotary assembly comprising a support block, a third toothed block, a fourth toothed block and a second fixed block provided on the main support member, one end of the third toothed block being fixed to the first bottom rod, the other end of the third toothed block being constrained between the support block and the second fixed block in a rotatable manner by a third rotation shaft, one end of the fourth toothed block being fixed to the second bottom rod, the other end of the fourth toothed block being constrained between the support block and the second fixed block in a rotatable manner by a fourth rotation shaft.

* * * * *